United States Patent
Chen

(10) Patent No.: US 9,217,819 B2
(45) Date of Patent: Dec. 22, 2015

(54) BACKLIGHT UNIT WITH CONDUCTIVE FILM AND METHOD FOR MANUFACTURING

(71) Applicant: Shui-Lung Chen, Taoyuan (TW)

(72) Inventor: Shui-Lung Chen, Taoyuan (TW)

( * ) Notice: Subject to any disclaimer, the term of this patent is extended or adjusted under 35 U.S.C. 154(b) by 232 days.

(21) Appl. No.: 13/706,347

(22) Filed: Dec. 5, 2012

(65) Prior Publication Data

US 2013/0170246 A1    Jul. 4, 2013

(30) Foreign Application Priority Data

Dec. 6, 2011   (TW) .............................. 100144815 A

(51) Int. Cl.
*F21V 23/00* (2015.01)
*F21V 8/00* (2006.01)

(52) U.S. Cl.
CPC ............ *G02B 6/0011* (2013.01); *G02B 6/0043* (2013.01); *G02B 6/0051* (2013.01); *G02B 6/0055* (2013.01); *G02B 6/0083* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,270,236 B1 * | 8/2001 | Brussog | ................ | F21S 48/215 362/227 |
| 6,644,832 B2 * | 11/2003 | Yoshida | ............ | G02F 1/133603 313/498 |
| 7,604,377 B2 * | 10/2009 | Yu | ........................ | H05K 1/0274 362/249.02 |
| 7,745,838 B2 * | 6/2010 | Lefevre | ............. | B32B 17/10036 257/40 |
| 8,210,716 B2 * | 7/2012 | Lerman | ................ | H05K 1/0204 257/88 |
| 8,338,199 B2 * | 12/2012 | Lerman | ............... | H01L 25/0753 257/59 |
| 8,338,839 B2 * | 12/2012 | Lerman | ............... | H01L 25/0753 257/100 |
| 8,414,154 B2 * | 4/2013 | Dau | ........................ | F21S 8/04 362/240 |

* cited by examiner

*Primary Examiner* — Ismael Negron
(74) *Attorney, Agent, or Firm* — Raymond Y. Chan; David and Raymond Patent Firm

(57) ABSTRACT

A backlight unit uses conductive, chemically toughened glass as substrate and includes a diffusion layer, a light guide layer, an optical microstructure layer, a transparent layer, a reflective layer and a light source module. The integrally formed backlight unit is fabricated using photochemical lithography, printing-coating, and ultrasonic hot melt adhesion processes.

8 Claims, 8 Drawing Sheets

BACKLIGHT UNIT WITH CONDUCTIVE FILM AND METHOD FOR MANUFACTURING

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a backlight unit integrally formed with conductive, chemically toughened glass and method for fabricating the same, more particularly a method for fabricating a one-piece backlight unit using photochemical lithography to fabricate an optical microstructure and using ultrasonic hot melt adhesive process to bond a light source module to an electrode circuit on the conductive, chemically toughened glass substrate of the one-piece backlight unit.

2. Description of Related Arts

Along with technological advancement, nowadays liquid crystal display (LCD) is used extensively in electronic products, such as mobile phones, notebook computers, tablet computers, digital cameras and LCD televisions. Because LCD is not a self-luminous device that it only comes with the function of light switch control, it requires the aid of planar light source from a backlight unit to achieve the display function.

FIG. 1 is an exploded view of a conventional backlight unit 10. Currently there are two types of backlight unit-bottom-lit backlight unit 10 and edge-lit backlight unit 10. Regardless of the type, backlight units 10 have similar components and structure, which mainly consist of an upper diffusion sheet 12, an upper prism lens 13, a lower prism lens 14, a lower diffusion sheet 15, a light guide plate 18, a reflective sheet 19, a plastic frame 17, an iron frame 20 and a light bar 16 stacked over each other and fixed with double-sided adhesive 11. The whole manufacturing process requires considerable manpower.

As electronic products are designed to be lighter, thinner, shorter and smaller, the bigger the sizes of light-guide plate 18, plastic frame 17 and iron frame 20 in conventional backlight units, the more difficult it is to make the product thinner. Moreover as upper diffusion sheet 12, upper prism lens 13, lower prism lens 14 and lower diffusion sheet 15 are respectively disposed on the substrate of backlight unit, the substrate has certain thickness requirement. Therefore as the design of electronic products is geared towards lightweight, thin, short and small, using ultrathin backlight unit with high efficiency in fabrication and high luminance is an important issue that the non-self-luminous display manufacturers must address at the present time.

In light of the problem discussed above, the present invention aims primarily to provide a one-piece backlight unit and its fabrication method to address the problems of being unable to achieve ultrathin unit, difficulty in increasing luminance, high costs of fabricating optical components, and lack of fabrication efficiency encountered by prior art. The backlight unit integrally formed with conductive, chemically toughened glass and method for fabricating the same of the invention simplifies the whole manufacturing process and results in lighter and thinner structure, while shortening the processing time and improving product yield. These are the foremost spirits of the invention to be disclosed.

SUMMARY OF THE PRESENT INVENTION

The object of the present invention is to provide a backlight unit integrally formed with conductive, chemically toughened glass and method for fabricating the same. The integrally formed backlight unit uses conductive, chemically toughened glass as substrate with an overall structure consisting of diffusion layer, a light guide layer, an electrode circuit, an optical microstructure layer, a transparent layer, a reflective layer and a light source module.

To achieve the aforesaid object, the present invention provides a backlight unit integrally formed with conductive, chemically toughened glass, comprising a light guide layer in the form of a transparent substrate, a conductive film, a diffusion layer, an optical microstructure layer, a transparent layer, a reflective layer and a light source module. The light guide layer made from a transparent substrate is made of chemically toughened glass in the shape of a thin plate. The thickness of the chemically toughened glass ranges from 0.1 mm to 5 mm. The conductive film is transparent and made of conductive material such as indium tin oxide (ITO), zinc oxide (ZnO), Ga-doped ZnO, and conductive polymer, which forms a predetermined circuit pattern on the transparent substrate of the light guide layer using photochemical lithography or laser beam, and has a surface resistance in the range of $4.5\Omega/\square$ to $650\Omega/\square$. The diffusion layer scatters the light from emitting surface uniformly into a planar light source and adjusts the color temperature of the planar light source. The diffusion layer is coated on the transparent layer and made of $SiO_2$ micro- and nanoparticles, dye, and acrylic resin or epoxy resin or mixture thereof in different proportions. The light transmittance of the diffusion layer ranges from 30% to 98%. The optical microstructure layer is made of high refractive index material and forms a predetermined optical microstructure pattern on the transparent substrate of the light guide layer using photochemical lithography or coating-printing process. Each microstructure in the optical microstructure layer ranges from 0.028 micron to 200 micron if photochemical lithography is used and ranges from 10 micron to 200 micron if coating-printing process is used. The optical microstructure layer refracts the incident light with its predetermined optical microstructure pattern, which is adjustable to adjust the distribution of incident light from the planar light source module. If photochemical lithography is used, the optical microstructure layer is made from $TiO_2$-added photoresist etched by photochemical lithography, or made by coating a layer of silver or aluminum in the optically active region on the reflective surface of the light guide layer and then coating the photoresist thereon, which is then etched into the optical microstructure layer using photochemical lithography. If coating-printing process is used, the optical microstructure layer consists of $TiO_2$ or silver or aluminum micro- and nanoparticles and acrylic resin or epoxy resin or mixture thereof. The transparent layer is made of transparent resin material coated on the reflective surface of transparent substrate of light guide layer and optical microstructure layer to allow the passage of light ray not refracted by the optical microstructure layer to the reflective layer. The transparent layer is made of transparent resin material consisting of acrylic resin or epoxy resin or mixture thereof. The reflective layer mainly reflects the light that has passed through the transparent layer to the light guide layer, where the light is refracted by the optical microstructure layer to reach the diffusion laser. The reflective layer is coated on the transparent layer using coating-printing process and is made of TiO2 or silver or aluminum micro- and nanoparticles and acrylic resin or epoxy resin or mixture thereof. The light source module consists of conductive material, a plurality of light emitting diodes and flexible circuit boards which are adhered and connected to the electrode circuit with a predetermined pattern on the conductive film using ultrasonic hot melt adhesive process. The light source module provides an incident light source in the integrally formed backlight unit to illuminate the connected keyboard or non-self-luminous display panel. The conductive material of the light source module is selected from a group consisting of gold, silver, copper, titanium, tin, cobalt, nickel and mixtures thereof.

To achieve the aforesaid object, the present invention provides a method for fabricating backlight unit integrally formed with conductive, chemically toughened glass, consisting of the steps of: preparing a conductive, chemically toughened glass substrate; forming a conductive film and fabricating an electrode circuit in the optically inactive region of the conductive film; fabricating an optical microstructure layer in the optically active region on the reflective surface of the conductive layer; fabricating a transparent layer on the electrode circuit in a region other than that for accommodating the light source module connected using hot melt adhesive process and on the surface of optical microstructure layer; fabricating a reflective layer on the surface of transparent layer and on the three non-incident side surfaces of the light guide layer and transparent layer; fabricating a diffusion layer on the light emitting surface of light guide layer; and adhering a light source module to the electrode circuit on the conductive, chemically toughened glass substrate using ultrasonic hot melt adhesive process to form a one-piece backlight module made of conductive, chemically toughened glass.

DETAILED DESCRIPTION OF THE PREFERRED EMBODIMENT

Figure 1:
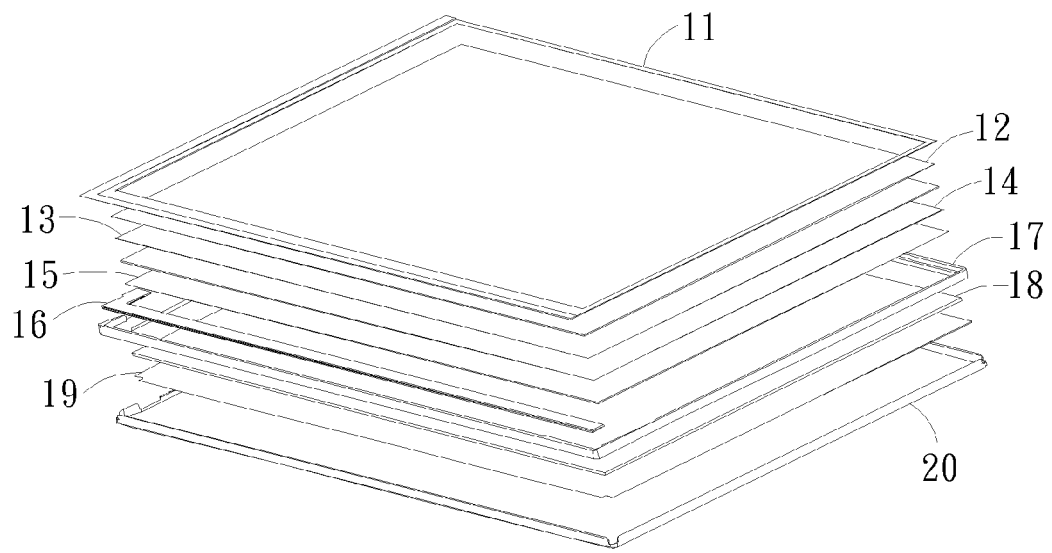
FIG. 1 is an exploded view of a conventional backlight unit.
Figure 2:
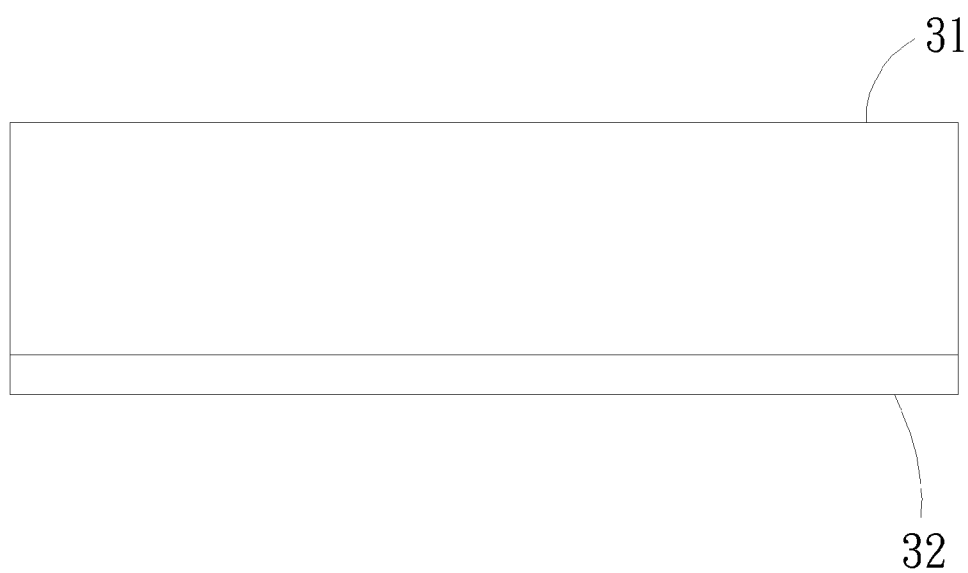
FIG. 2 is a sectional view of the conductive, chemically toughened glass according to the invention.
Figure 3:
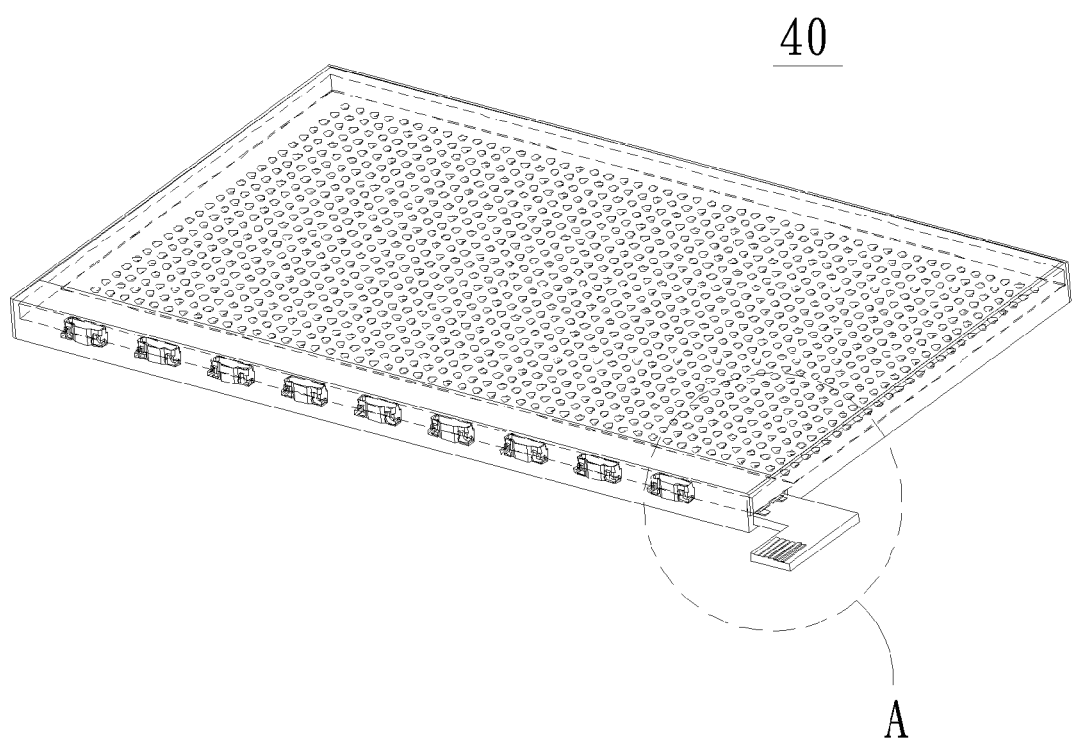
FIG. 3 is a perspective view of the backlight unit integrally formed with conductive, chemically toughened glass according to a preferred embodiment of the invention.

The implementation of the invention is described below through specific embodiments of the invention. Persons skilled in the art can easily understand other advantages and effects of the invention through the description disclosed herein.

The embodiments of the invention are described below in reference to the accompanying drawings. It should be noted that the drawings are simplified schematic drawings to illustrate the basic ideas of the invention schematically. The diagrams only depict the related structure of the invention and are not drawn according to the actual number, shapes and dimensions of components used in actual implementation, and hence should not be construed as a limitation on the forms, quantities and dimensions of respective components in actual implementation, which may vary based on the actual design needs.

Referring to FIGS. 2~8, the backlight unit integrally formed with conductive, chemically toughened glass 40 according to the invention comprises a diffusion layer 41, a light guide layer 42, an optical microstructure layer 43, a transparent layer 44, a reflective layer 45, a light source module 46 and a electrode circuit 47 integrally formed in one piece.

Figure 6:
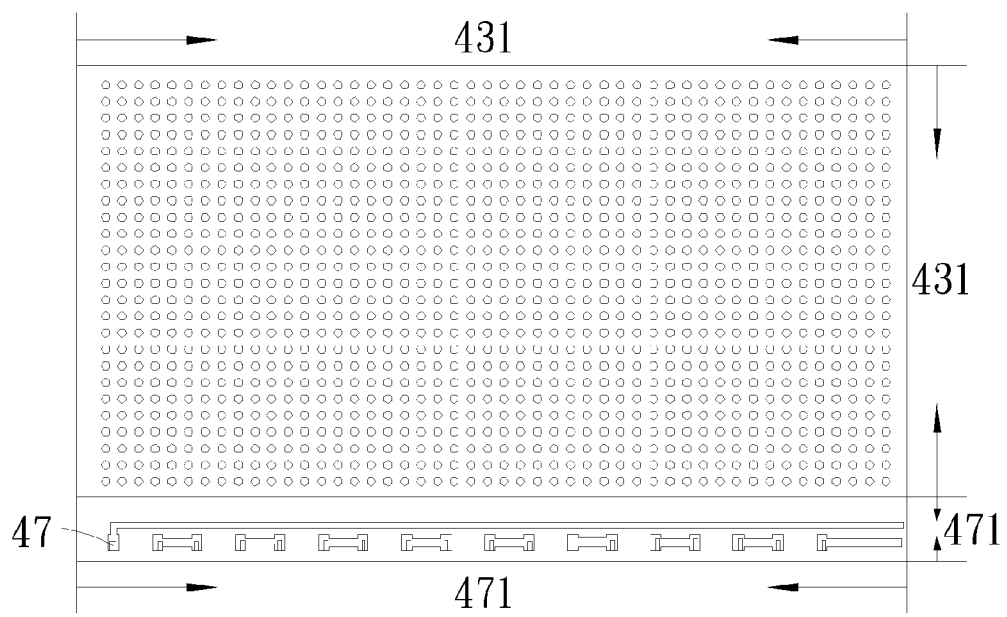
FIG. 6 is a top view of the optically active region and the optically inactive region in FIG. 5.
Figure 7:
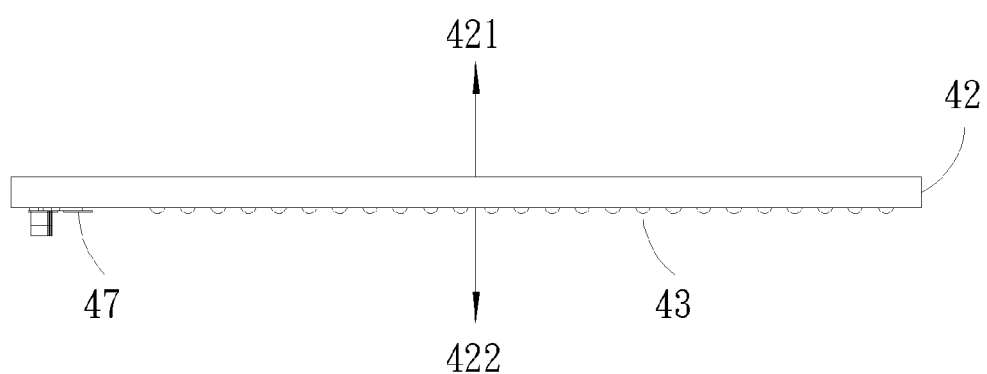
FIG. 7 is a sectional view of the light emitting surface and the reflective surface in FIG. 5.
Figure 8:
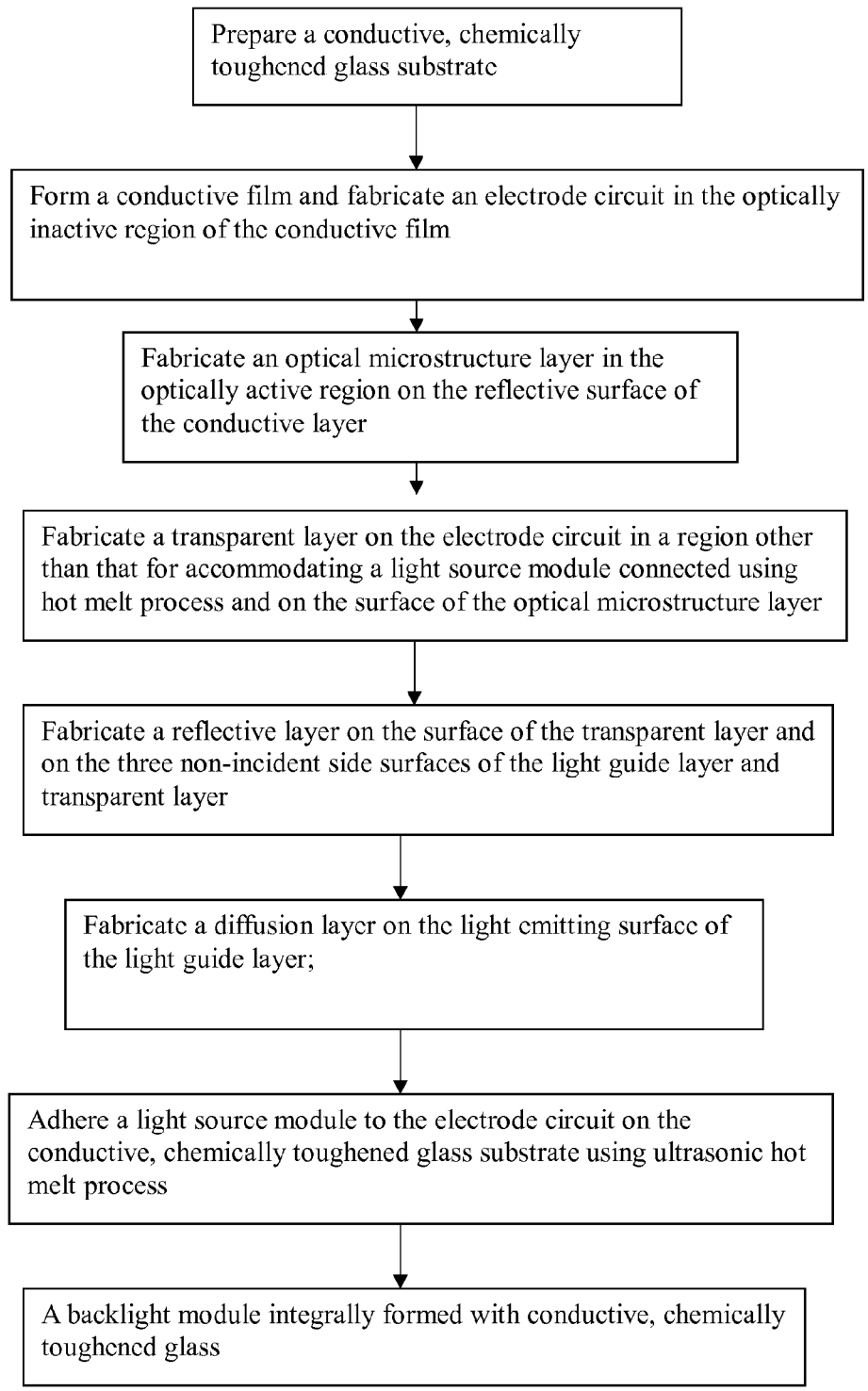
FIG. 8 is the process flowchart of the invention.

The chemically toughened glass 31 in the conductive, chemically toughened glass substrate 30 is used as the light guide layer 42 in the backlight unit integrally formed with conductive, chemically toughened glass 40. In step 51, the conductive film 32 in the substrate is etched in the optically inactive region 471 using chemical lithography or laser beam to fabricate an electrode circuit 47. In step 52, after the fabricated electrode circuit 47 is subject to short circuit and open circuit tests and laser trimming, the optical microstructure layer 43 is fabricated using chemical lithography or coating-printing process. Both the electrode circuit 47 and the optical microstructure layer 43 are fabricated on the reflective surface 422 of light guide layer 42 and conductive film 32 in their respective functional regions, that is, electrode circuit 47 is formed in the optically inactive region 471, while optical microstructure layer 43 is formed in the optically active region 431 as shown in FIG. 6 and FIG. 7.

In step 53, transparent resin is printed using coating-printing process on regions of the electrode circuit 47 other than the region of electrodes for electrical connection with the light source module 46 and on the optical microstructure layer 43 to form a transparent layer 44.

Figure 4:
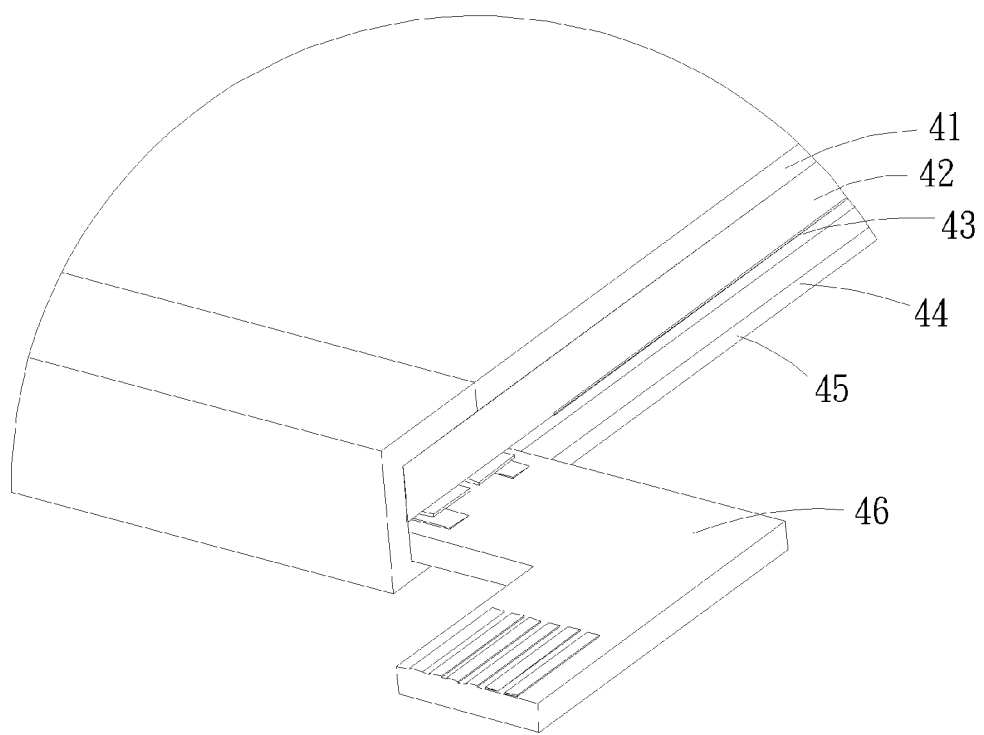
FIG. 4 is a magnified view of part A of FIG. 3.
Figure 5:
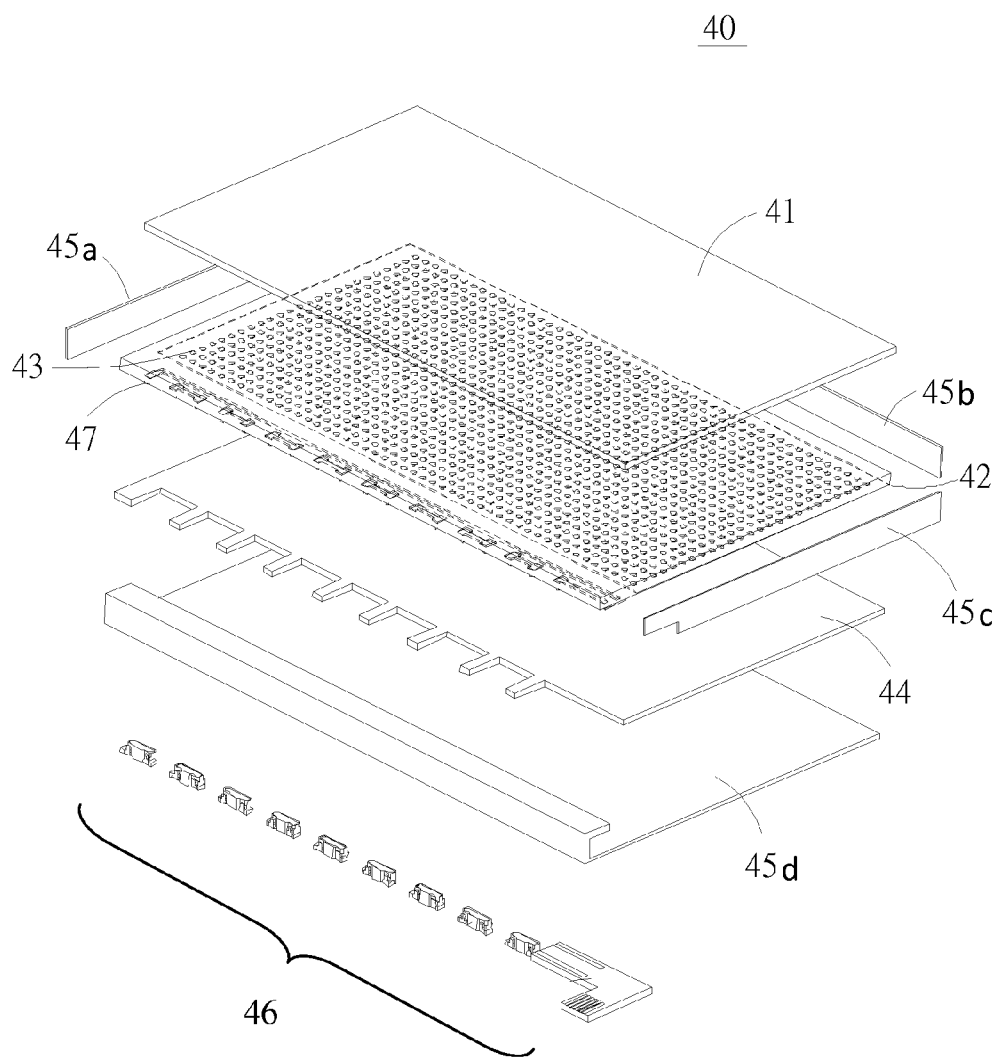
FIG. 5 is an exploded view of the backlight unit integrally formed with conductive, chemically toughened glass according to a preferred embodiment of the invention.

In step 54, ink containing micro- and nanoparticles added with TiO2 or silver or aluminum with high reflectivity and acrylic resin or epoxy resin or mixture thereof is printed using coating-printing process on the surface of transparent layer 44 and on the three non-incident side surfaces of light guide layer 42 and transparent layer 44 as shown in FIG. 4.

In step 55, ink containing acrylic resin or epoxy resin or mixture thereof added with dye, TiO2, acrylic resin and SiO2 micro- and nanoparticles is printed on the light emitting surface 421 of the light guide layer 42 using coating-printing process.

In the final step 56, the light source module 46 is adhered to the electrode circuit 47 on the conductive, chemically toughened glass 30 using ultrasonic hot melt adhesive process to form a backlight unit integrally formed with conductive, chemically toughened glass 40.

Specifically, the diffusion layer 41 contains transparent resin and diffusing microparticles dispersed therein. The light guide layer 42 is a substrate using conductive, chemically toughened glass 30 as material and possesses total light transmittance. The conductive film 32 on the surface of the light guide layer 42 mainly works in the optically inactive region 471 of the backlight unit to fabricate the electrode circuit 47 thereon. Subsequently the light source module 46 is adhered to the electrode circuit using ultrasonic hot melt adhesive process to form a backlight unit integrally formed with conductive, chemically toughened glass 40. The conductive film 32 in the optically active region 431 of the integrally formed backlight unit does not need to form an electrode circuit 47 but is totally etched to the light guide layer 42. Next in the optically active region 431 on the reflective surface 422 of the light guide layer 42 that is free of conductive film 32, the optical microstructure layer 43 is formed thereon using photochemical lithography or coating-printing process, and transparent resin is coated on the reflective surface 422 of the optical microstructure layer 43 and the light guide layer 42 to form a transparent layer 44. Next, a reflective layer 45 has a flat portion 45a coated on the surface of the transparent layer 44 and side portions 45b, 45c and 45d coated on the three non-incident side surfaces of the light guide layer 42 and transparent layer 44.

When the backlight unit of the invention is in use, light ray first enters and travels through the light guide layer 42. The part of light ray refracted by the optical microstructure layer 43 reaches the diffusion layer 41, and the part of light ray not refracted by the optical microstructure layer 43 travels through the transparent layer 44 and is reflected by the flat portion 45a and side portions 45b, 45c and 45d of the reflective layer 45 to pass through the transparent layer 44 and light guide layer 42, where it is refracted by the optical microstructure layer 43 and reaches the diffusion layer 41 through the light guide layer 42. The light ray in the diffusion layer 41 is scattered uniformly into a planar light source. As such, light ray that is incident to the light guide layer 42 does not need to pass through the air before it is emitted, thereby reducing transmission loss. Therefore the backlight unit integrally formed with conductive, chemically toughened glass 40 offers the advantages of high luminance, ultra thinness, low component costs, easy to increase production efficiency and light utilization efficiency.

The preferred embodiments of the present invention have been disclosed. It should be understood that all additions, modifications and substitutions made to the preferred embodiments of the invention without departing from the spirits of the invention and appended claims shall remain within the protected scope and claims of the invention. Persons skilled in the art can realize that the invention can be applied in modified form, structure, arrangement, proportion, material, element and component. Therefore, the examples cited above are meant to explain the invention and not to limit the invention. The actual applicable scope of the invention is defined by the claims below and covers all legal equivalents thereof without being limited by the descriptions above.

What is claimed is:

1. A backlight unit, comprising:
    a light guide layer formed of a transparent substrate having shaped as a thin plate and made of chemically toughened glass with a thickness ranging from 0.1 mm to 5 mm;
    a conductive transparent film made of conductive material forming a predetermined circuit pattern on the transparent substrate of the light guide layer, and having a surface resistance in the range of 4.5 ohms per square to 650 ohms per square;
    a diffusion layer for scattering light from emitting surface uniformly into a planar light source and adjusting the color temperature of the planar light source, the diffusion layer having transparent resin, diffusing particles and a dye in different proportions, and having a light transmittance in the range of 30% to 98%;
    an optical microstructure layer made of high refractive index, including a plurality of microstructures forming a predetermined optical microstructure pattern on the transparent substrate of the light guide layer, the optical microstructure layer being for refracting incident light;
    a transparent resin layer disposed on a surface of transparent substrate and optical microstructure layer, to allow the passage of light ray not refracted by the optical microstructure layer to a reflective layer;
    a reflective layer for reflecting the light ray having passed through the transparent layer to the light guide layer; and
    a light source module consisting of conductive material, a plurality of light emitting diodes and flexible circuit boards, adhered and connected to the predetermined circuit pattern on the conductive film, the light source module providing an incident light source in the backlight unit.

2. The backlight unit according to claim 1, wherein the conductive film is selected from a group consisting of indium tin oxide (ITO), zinc oxide (ZnO), Ga-doped ZnO, and conductive polymer.

3. The backlight unit according to claim 1, wherein the conductive material used in the light source module is selected from a group consisting of gold, silver, copper, titanium, tin, cobalt, nickel and mixtures thereof.

4. The backlight unit according to claim 1, wherein the transparent resin in the diffusion layer consists of acrylic resin or epoxy resin or mixture thereof; the diffusing particle is $TiO_2$, acrylic resin or $SiO_2$ micro- and nanoparticles or mixture thereof; and the dye.

5. The backlight unit according to claim 1, wherein the material of the transparent layer is acrylic resin, an epoxy resin, or mixture thereof.

6. The backlight unit according to claim 1, wherein the width of each microstructure in the optical microstructure layer ranges from 0.028 micron to 200 micron if the layer is fabricated using photochemical lithography and ranges from 10 micron to 200 micron if the layer is fabricated using coating-printing process.

7. The backlight unit according to claim 6, wherein the optical microstructure layer includes either a) titanium dioxide ($TiO_2$) etched by photochemical lithography into the optical microstructure layer, or b) a layer of silver or aluminum etched into the optical microstructure layer using photochemical lithography.

8. The backlight unit according to claim 6, wherein the optical microstructure layer includes $TiO_2$, or silver or aluminum micro- and nanoparticles and acrylic resin or epoxy resin, or mixture thereof.

* * * * *